Feb. 22, 1927.
M. L. FRINK
1,618,703
SHOCK ABSORBER AND EQUALIZER
Filed July 13, 1925
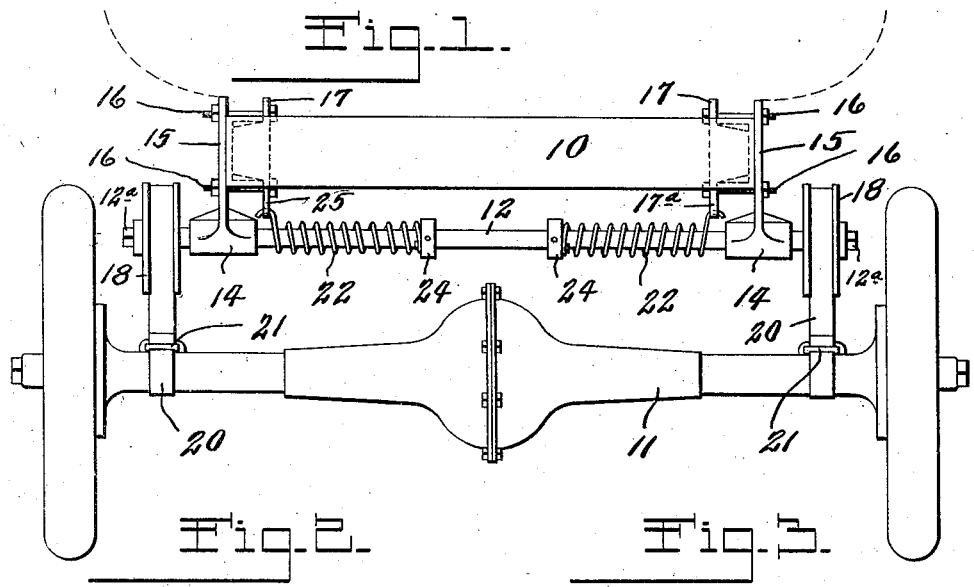
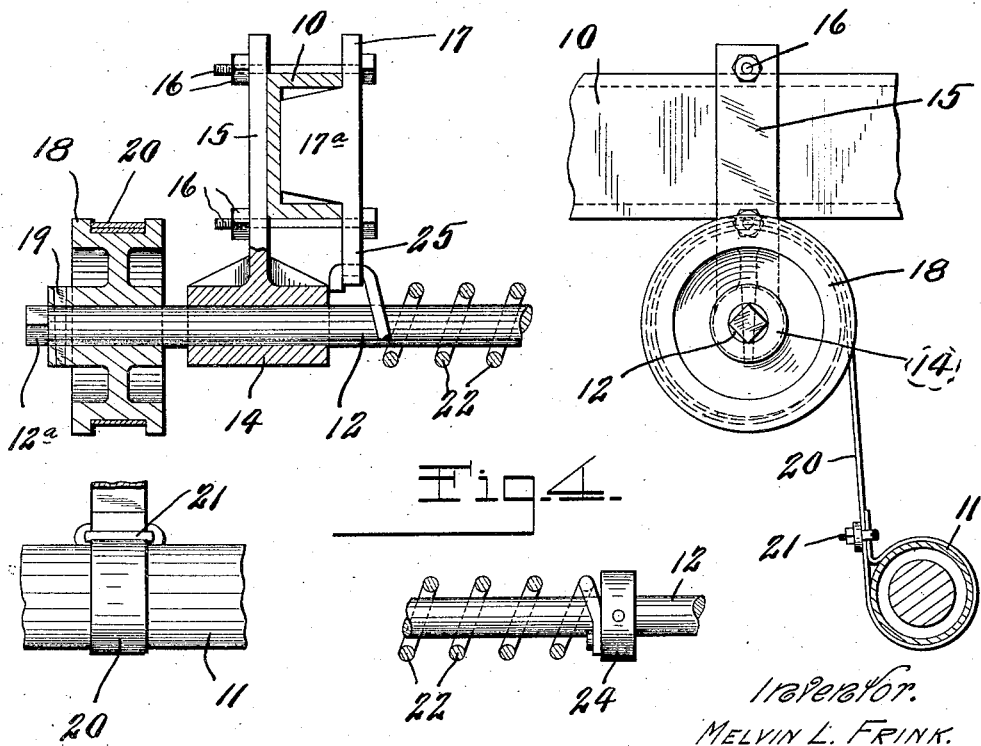
Inventor.
MELVIN L. FRINK.
By Cornwall, Bidell & James
Attorneys.

Patented Feb. 22, 1927.

1,618,703

UNITED STATES PATENT OFFICE.

MELVIN L. FRINK, OF WELLSTON, MISSOURI, ASSIGNOR, BY DIRECT AND MESNE ASSIGNMENTS, OF ONE-THIRD TO WILLIAM KRIZ AND TWO-THIRDS TO FREDERICK D. REYNOLDS, OF ST. LOUIS, MISSOURI.

SHOCK ABSORBER AND EQUALIZER.

Application filed July 13, 1925. Serial No. 43,192.

This invention relates to new and useful improvements in shock absorbers and equalizers for vehicles, the objects being to provide a device for checking and equalizing the rebound action of the vehicle, said device having an operating member extending transversely of the chassis of the vehicle for simultaneously and equally operating the device at both sides of the vehicle chassis thereby eliminating side-sway of the vehicle and distributing the rebound movement evenly to both sides thereof.

Further objects of the invention are to provide an efficient shock absorber and equalizer for vehicles which is simple in operation, serves to check and equalize the rebound movement of both ends of the chassis, can be readily attached in position, and can be economically manufactured.

Still further objects of the invention are to provide simple means for adjusting the tension of the device.

With these and other objects in view, my invention consists in certain novel features of construction and arrangement of parts, hereinafter more fully described and claimed, and illustrated in the accompanying drawings, in which—

Figure 1 is a rear end view of the vehicle equipped with my improved shock absorber and equalizer.

Figure 2 is a vertical cross section taken longitudinally through the device and showing parts of the vehicle to which said device is connected.

Figure 3 is a side elevational view of same.

Figure 4 is a detail view showing the manner in which the tension member is connected to the transverse shaft of the device.

The invention herein disclosed consists of devices including springs for controlling or checking the relative movement or movements of the vehicle body and the axles and said device or devices are used independently of the usual spring suspension of the vehicle.

Referring by numerals to the accompanying drawings, 10 indicates the chassis of a vehicle and 11 one of the axles thereof. A shaft 12 is disposed transversely of the vehicle and parallel with the axle 11 and is revolubly journaled near its ends in bearings 14 formed integral with brackets 15 which are supported by the side members of the chassis by means of fastening devices 16 and plates 17. Each plate 17 is provided with a protuberance 17$^a$ which fits between the horizontally disposed flanges of the side members of chassis 10, as shown in Figure 2.

A pulley 18 is secured to each end of shaft 12 in any suitable manner, such as a pin 19, and operating over said pulley is a strap 20, one end of which is fixed to said pulley while the opposite end extends downwardly and encircles axle 11 and the extremity of said end is attached to the body portion of the strap by a clamp 21, thereby preventing disengagement of the strap from axle 11.

A pair of coiled springs or resilient members 22 is arranged on shaft 12 and the inner ends of said members are anchored to collars 24 which are fixed to said shaft 12. The outer ends of said springs have fixed relation with respect to the chassis of the vehicle and are preferably anchored to extensions 25 of plates 17. Springs 22 are preferably left handed and right handed and the tension of said springs is in a direction away from the axle in order to maintain the straps 20 in taut positions, as indicated by the arrow in Figure 3. One or both ends of shaft 12 may be provided with square heads, as indicated at 12$^a$, whereby said shaft may be turned in the proper direction to adjust the tension of said springs. The tension of said springs may also be adjusted by releasing clamps 21 and drawing up or releasing the strap.

When the chassis and the axle of the vehicle are moved inwardly relative to each other, the straps are wound on the pulley 18 by virtue of springs 22. During the return or outward movement of the vehicle parts, pulleys 18 will be turned in opposite directions, thereby winding or increasing the tension of springs 22 and thus retarding the rebound movement of the vehicle parts. By virtue of the fact that shaft 12 extends throughout the width of the chassis, the rebound movement will be equalized whereby both sides of the vehicle will move in unison, thereby eliminating side motion or sway thereof. The springs 22 are of equal tension and by using the two springs, great flexibility is provided.

In the drawings, my improved shock absorber and equalizer is shown as applied to the rear axle of a vehicle, but it is obvious that my invention is equally as well adapted and is intended for use with the front axle also.

While I have shown and described the preferred form of my improved shock absorber and equalizer, it will be readily understood that minor changes can be made in the construction, without departing from the spirit of my invention.

I claim:

1. A shock absorber and equalizer comprising a revoluble member adapted to be carried transversely of a vehicle chassis, a pulley carried by each end of said member, flexible connections connected to the peripheries of said pulleys with the axle adjacent to each side of said chassis for imparting rotary movement to said pulleys by the relative movements of said chassis and said axle, and a resilient member connected to said chassis and said revoluble member for retarding the relative movements of said chassis and said axle.

2. A shock absorber and equalizer comprising a vehicle chassis, a revoluble member carried transversely by and coextensive with the width of said chassis, a pulley fixed to each end of said shaft, a flexible connection connected to the vehicle axle and to each pulley for actuating said revoluble member by the relative movements of said axle and said chassis, and a resilient member connected to said revoluble member and said chassis for opposing the actuation of said revoluble member and retarding the relative movement of said chassis and said axle.

3. In a device of the class described, a shaft adapted to be carried by a vehicle chassis parallel with the axle thereof, a pulley for each end of said shaft, a flexible connection secured to the axle and in peripheral engagement with each of said pulleys for rotating the latter by the relative movements of said axle and said chassis, and a coil spring on said shaft having one end fixed and the other in cooperative relation with said pulleys for opposing the revoluble movement thereof, thereby retarding the relative movements of said axle and said chassis.

4. In a device of the class described, a revoluble shaft extending transversely of and in fixed relation with the vehicle chassis, a pulley fixed to each end of said shaft, a strap operating over each pulley and secured to the vehicle axle whereby the relative movements of said vehicle and said axle actuates through said pulleys said shaft, and a spring arranged in cooperative relation with said shaft for yieldingly resisting the revoluble movement of said shaft, thereby retarding the relative movements of said vehicle parts.

5. A shock absorber and equalizer for vehicles comprising a revoluble shaft extending transversely of and carried by a vehicle chassis, a pulley fixed to each end of said shaft, a strap fixed at one end to the peripheral surface of said pulley and operating thereover and having its opposite end fixed to said vehicle axle, whereby the relative movement of one end of said axle and one side of said chassis actuates both pulleys to preserve parallelism between the axle and the vehicle chassis, and coiled springs arranged on said shaft and anchored at one of their ends to said shaft and at the opposite ends to said vehicle chassis for offering yielding resistance to the revoluble movement of said shaft.

6. In a shock absorber and equalizer for vehicle chassis, the combination with the vehicle chassis and the axle thereof, of bearings fixed to the opposite sides of said chassis, a revoluble shaft journaled in said bearings and disposed parallel to said axle, pulleys fixed to each end of said shaft, a flexible connection attached to one end of said axle and operating over said pulley whereby the relative movement of said axle and said chassis causes revoluble movement of said shaft, and tension members arranged on said shaft for yieldingly opposing the rotary movement thereof.

7. In a shock absorber and equalizer for vehicles, the combination with the vehicle chassis and an axle thereof, of brackets attached to the side members of said chassis, bearings carried by said brackets, a shaft disposed transversely of said chassis and journaled in said bearings, a pulley fixed to each end of said shaft, a strap fixed at one end to the peripheral face of said pulley and operating thereover and fixed at the opposite end to the axle, and a pair of coiled springs anchored at one of their ends to said shaft and at the opposite ends to said chassis for resisting the revoluble movement of said shaft and thereby retarding the relative movement of said chassis and said axle.

In testimony whereof I hereunto affix my signature this 25th day of June, 1925.

MELVIN L. FRINK.